Sept. 6, 1949.
E. J. SCHLATTER
DEVICE FOR USE IN CONSTRUCTING MAPS FROM AERIAL PHOTOGRAPHS
2,481,246
Filed Feb. 9, 1945
2 Sheets-Sheet 1
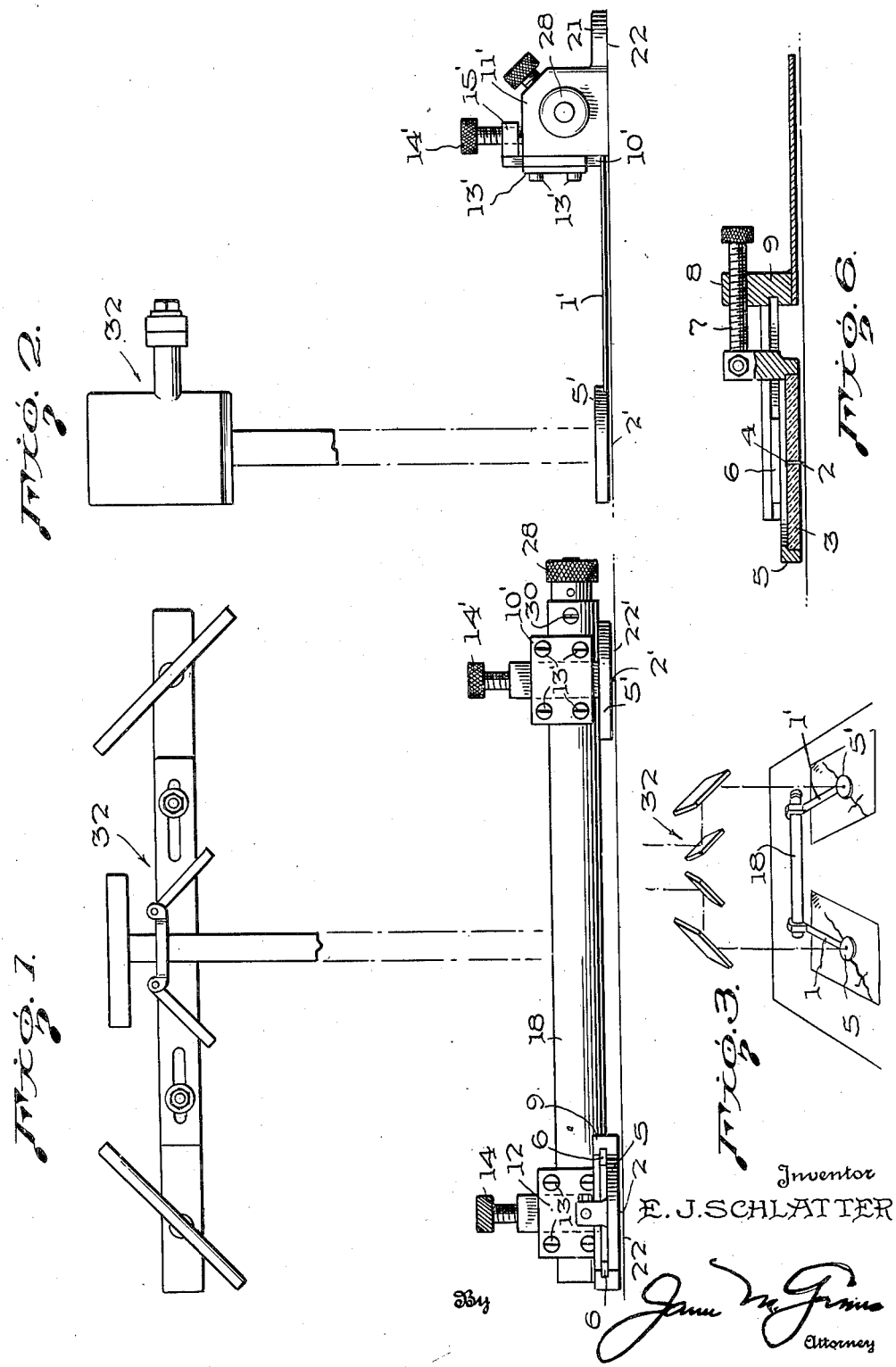
Inventor
E. J. SCHLATTER
By
Attorney Sept. 6, 1949.  E. J. SCHLATTER  2,481,246
DEVICE FOR USE IN CONSTRUCTING
MAPS FROM AERIAL PHOTOGRAPHS
Filed Feb. 9, 1945  2 Sheets-Sheet 2
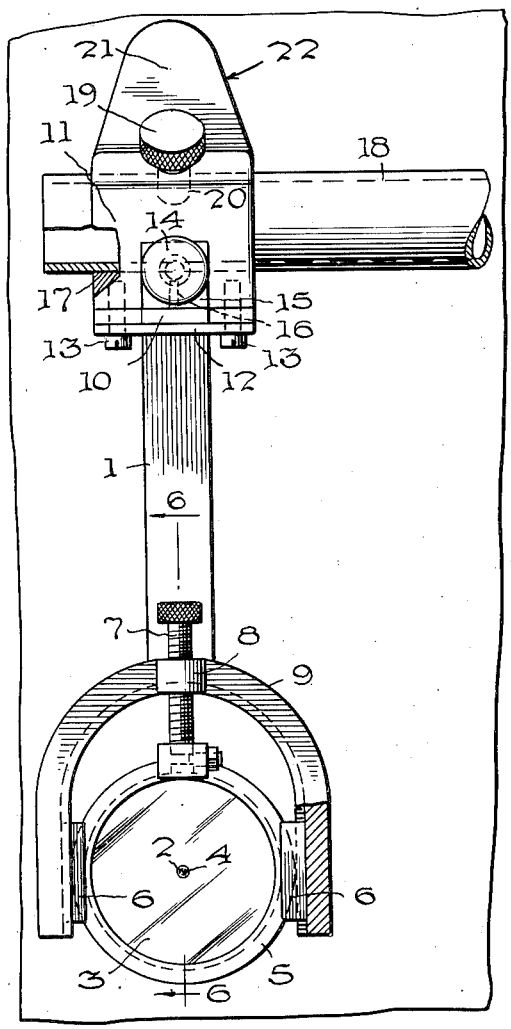
Fig. 4.
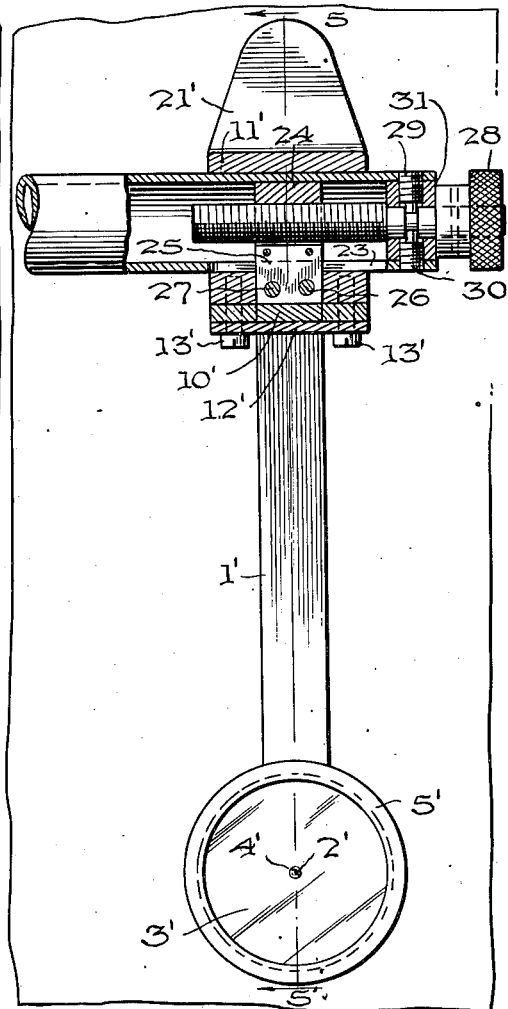
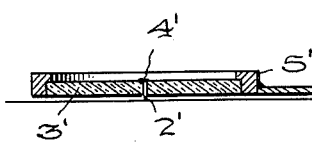
Fig. 5.
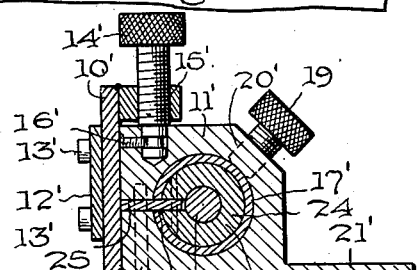
Inventor
E. J. SCHLATTER
By James M. Graves
Attorney Patented Sept. 6, 1949

2,481,246

UNITED STATES PATENT OFFICE 2,481,246

DEVICE FOR USE IN CONSTRUCTING MAPS FROM AERIAL PHOTOGRAPHS

Eugene J. Schlatter, Washington, D. C.

Application February 9, 1945, Serial No. 577,095

7 Claims. (Cl. 33—189)

The invention herein described relates to the production of maps from aerial photographs, and to the use of individual or stereoscopic pairs of aerial photographs for land studies, geologic studies, area measurements, linear measurements, or other uses involving extraction of data from aerial photographs.

Aerial photographs are commonly taken in consecutive order along a more or less straight line defined by the path of the airplane in flight. The photographs are taken at such intervals of time that each photograph overlaps the next one in the line of flight by about 60%, that is, about 60% of the ground area shown on a photograph will appear on the next photograph. The photographs taken along such a flight line are commonly called a "strip." The flight lines of the airplane are spaced laterally so that there will be a small overlap between adjacent strips, usually amounting to about 30% of the lateral dimension of one picture. The photographic coverage of an area or a project is planned in such manner so that it will be possible to determine the relative scale or size between any two overlapping photographs by comparing measured distances between like images on the photographs.

The methods of orienting successive aerial photographs in correct geodetic or geographic position and direction known as the slotted templet method, the spider templet method, the analytical ray method, the analytical mathematical method, and the hand templet method all depend on the accurate transfer by pricker-point or other marking means of identifiable image-points selected on one photograph to those identical points on overlapping photographs. In many cases these selected image-points must appear within a certain limited area on the photograph to permit use of the particular technical method adopted. The numerous methods of determining the scale, the size, and the tilt of individual photographs progressively along a flight strip likewise very often depend on the precise transfer of selected image-points from one photograph to an overlapping one. Again, in most cases, these image-points must appear within a certain limited area on the photograph.

It is a common occurrence to find that there are no images of well-defined objects in the area or areas on a photograph where an image-point is badly needed. For example, a photograph showing prairie land may have a large expanse without a conspicuous definable image-point. Areas covered by forest present similar difficulties, as do expanses of water.

The purpose of this invention is to provide an improved optico-mechanical means for use in conjunction with either a lens stereoscope or a mirror stereoscope to effect a more precise transfer and marking of desired points from one photograph to an overlapping one regardless of whether or not an image definable by the naked eye exists in the desired area. The instrument is so designed that the point identification and the marking may be accomplished in one operation and so that the operator may at all instants during the point transfer check the accuracy of his work.

When two overlapping aerial photographs are placed under a stereoscope and properly spaced and oriented an observer looking into the stereoscope will perceive the illusion of the so-called third dimension, that is, the tops of hills will appear above the valleys, the tops of trees will appear above the ground and various other points will appear to be at their distinctive elevations. The observer will, in effect, see the terrain as though he were suspended in the air up above the area. If an observer were viewing two overlapping photographs stereoscopically and noted a particular point on the ground such as the intersection of two sharply defined narrow paths he would see that it was at ground level. If he were to then temporarily remove the stereoscope and with a fine pen put a small dot of ink on each photograph where the intersection appeared, and afterward restore the stereoscope and again look through it, he would see a small black dot, consisting of the fused image formed by the two ink dots, which appear to rest at the level of the ground, exactly on the intersection of the paths. If the particular point were the top of a flagpole and the same procedure were followed the fused dot would appear to be exactly at the top of the flagpole through the stereoscope. Conversely, if an observer looks stereoscopically at two overlapping photographs, and then manipulates two small dots, one with his left hand and one with his right hand, until the fused dot as seen through the stereoscope appears to rest exactly on and at the same level of a particular point in the stereoscopic area, the left-hand dot will be exactly on the point on the left picture, and the right-hand dot will be exactly on the corresponding point on the right-hand picture.

Furthermore, if the fused dot rests apparently on the ground in an open expanse where there is no definable image-point the left-hand dot and the right-hand dot will be on the same point on the two corresponding photographs.

The invention is designed to accomplish the accurate and rapid transfer of points from one photograph to an overlapping one and to permit the operator to actually see and check the position of the fused dot as the points are being marked on the two photographs, that is, the points are marked while the fused dot appears visually to be resting at the desired level and it can be checked after the points have been marked. In practice two overlapping photographs will be properly spaced and oriented under either a lens type or a mirror type stereoscope so that a stereoscopic fused image is perceptible, and will be fastened or held in position on a table top or other suitable flat surface.

The invention, hereinafter referred to as the stereo-marker, consists essentially of two transparent, rigid disks, each carrying in its approximate center a dot or other suitable mark, and having a needle point fastened in the under side of each disk, said needle point to be directly beneath the mark. The disks are fastened to a round connecting bar by means of arms and sliding connections so that relative motion between the disks may be possible in a left-right direction, in a forward-back direction, and in a vertical direction. In other words, the disks have three directional movement with relation to each other. Suitable hand screws are provided to obtain fine adjustment of these motions.

The stereo-marker will be placed on the photographs so that the two marker-disks face the observer. These disks each have a very fine needle point protruding from the lower surface. When viewed from above, these needles, whose upper ends are covered with black or other distinctive colored pigment or dye or other coloring matter, appear as small dots. By means of the two vertical adjusting screws at the rear of the arms, the disks will be raised up so that the needle points will be above the surface of the pictures, and will not catch thereon as the marker is shifted about. The right-left distance between the disks will now be roughly adjusted to the right amount by loosening the clamp screw at the rear of the left arm and sliding the arm along the rear horizontal bar until that distance is approximately equal to the distance between like images on the two pictures. Then, some particular area, in which a point is desired will be selected.

The stereo-marker will be shifted by hand until the two dots are approximately near that area. The vertical adjustment screws will then be manipulated until the needle-points have been lowered to where they are almost on the surface of the photographs, the clearance probably being not more than two or three hundredths of an inch. Then, while looking through the stereoscope, the observer will manipulate the horizontal screw adjustment attached to the left disk and will simultaneously manipulate the screw adjustment attached to the rear of the right arm, and possibly shift the whole instrument slightly until the fused dot formed by the tops of the two needle-points rests at the exact level he desires and on the exact point he desires. Then, while continuously viewing the fused dot to note that it remains in proper position he will depress the markers by pressure with his left and right thumbs on the left and right arms, which are to be constructed of spring metal or other resilient material. While doing this he will hold the stereo-marker in steady position by bearing down with his fingers on the rounded triangular flanges at the extreme rear of the right and left arms. As he depresses the spring steel arms, the needle points, which protrude a small distance below the under surface of the transparent disks will pierce fine holes in the emulsion of the photograph. The operator continuously watches the fused dot while the photographs are being pierced, to assure that it remains in correct position and elevation. In this manner he can check the accuracy of his work at all times.

It will be obvious that in many instances a point which has previously been marked on one photograph must be transferred to an overlapping photograph. In such case the stereo-marker is manipulated as described above until the fused dot is in proper precise position and elevation. Then, however, instead of depressing both spring metal arms, the operator will only depress one arm, that one which is over the photograph to be marked. Since the point on the other photograph has previously been marked, its corresponding marker will not be depressed. Again, the operator can check the precision of his marking as it is being done. Recapitulating, the invention is so designed that a point can be marked on either the left photograph, or the right photograph, or both photographs simultaneously, without changing the position of the instrument.

After one point has been transferred, the stereo-marker will be moved to position for transfer of the next selected point. Again that point can be transferred from the left photograph to the right photograph; from the right photograph to the left photograph, or can be simultaneously marked on both photographs at the will of the operator.

The point transfer will be effected from picture to overlapping picture either along the flight strip or between adjacent flight strips as the necessities of the work and the particular technical method of using the photographs dictate. As many points as are necessary, and in the locations where they are needed, can be transferred from picture to picture. While the floating dot is used in illustrating the operation of this invention, the mark may consist of some other geometric form such as a small circle, a small cross, or other suitable form.

The foregoing description is believed to be adequate to convey a clear impression of how the device functions in the basic operation of transferring a point from one photograph to an overlapping one. Of course, this basic operation will be repeated until sufficient points have been transferred to satisfy the technical demands for a project of any given size or area, covering anywhere from two photographs to an unlimited number of photographs.

A more detailed description is given below of the use and operation of the stereo-marker with particular reference to the accompanying drawings in which like reference characters denote like parts, and in which:

Fig. 1 is a front view of the stereo-marker in proper position under a mirror-type stereoscope;

Fig. 2 is a side view of the stereo-marker and stereoscope in the same operating position as shown in Fig. 1;

Fig. 3 is a perspective view of the stereo-marker and stereoscope and also showing two aerial photographs in relative position for point transfer;

Fig. 4 is a top plan view of the stereo-marker, partly in section and partly broken away;

Fig. 5 is a section of the device taken along line 5—5 of Fig. 4; and

Fig. 6 is a side view of the device in section taken along line 6—6 of Fig. 4.

On the left-hand arm 1 the fine needle-point 2 is fastened in the lower surface of the rigid transparent disk 3. The top of this needle, as seen from above, is colored with a dye or pigment or other coloring matter so as to look like a small dot 4. The disk is supported in a circular frame 5 which in turn is supported in two grooved recesses 6 and can be moved longitudinally with respect to arm 1 by means of adjusting screw 7 which operates through a lug 8 fastened to collar 9. Collar 9 supports the recessed parts 6 and is rigidly fastened to spring arm 1 at its front end. At the back end spring arm 1 is rigidly fastened to vertical slide plate 10. Slide plate 10 is held against the vertical face of housing 11 by means of retaining plate 12 and screws 13 in such a way that it can be moved vertically by means of adjustment screw 14 operating in a threaded lug 15 attached to the top of slide plate 10. Screw 14 is retained in proper position by screw 16 bearing in a recess at the lower end of screw 14. The tension on screws 13 is such that the fit between slide plate 10 and housing 11 is a snug sliding fit.

Housing 11, by virtue of a circular bore 17, fits snugly on bar 18 and may be slid along to various positions on the bar. Housing 11 is equipped with a clamp screw 19 which engages threads 20 in the housing and permits it to be firmly clamped to bar 18 in any desired position. Flange 21 at the rear of housing 11 is an integral part of the housing, and is to be used as a means of holding the stereo-marker in steady position by virtue of downward vertical pressure exerted on it by the operator's fingers. Bar 18 is in the form of a circular tube. The base 22 of housing 11 constitutes the base of the left part of the stereo-marker and in operation it will rest either on the photograph or on the working surface which supports the photograph.

On the right-hand arm 1' a fine needle-point 2', similar to needle point 2, is fastened in the lower side of rigid, transparent disk 3'. The top of this needle, as seen from above, is colored with a dye, or pigment, or other coloring matter so as to look like a small dot 4'. The disk is supported in a circular frame 5'. The frame 5' is rigidly attached to the front end of spring-arm 1'. At the back end, spring arm 1' is rigidly fastened to vertical slide plate 10'. Slide plate 10' is held against the vertical face of housing 11' by means of retaining plate 12' and screws 13' in such a way that it can be moved vertically by means of adjustment screw 14' operating in a threaded lug 15' attached to the top of slide plate 10'. Screw 14' is retained in proper position by screw 16' bearing in the recess at the lower end of screw 14'. The tension on screws 13' is such that the fit between housing 11' and slide plate 10' is a snug sliding fit. Housing 11', by virtue of a circular bore 17', fits snugly on bar 18 near the right end thereof. Flange 21' at the rear end of housing 11' is an integral part of the housing, and is to be used as a means of holding the stereo-marker in steady position by virtue of downward vertical pressure exerted on it by the operator's fingers. The base 22' of housing 11' constitutes the base of the right part of the stereo-marker and in operation it will rest either on the photograph or on the working surface which supports the photograph.

Horizontal bar 18 is in the form of a hollow tube. At the right end there is a horizontal slot 23 in bar 18 to permit housing 11' to be rigidly connected to nut 24 by means of plate 25, which is a flat strip of metal securely fastened in a slot in housing 11' by means of screws 26 and 27. This flat strip of metal is rigidly fastened at the other end to sliding nut 24. Nut 24 has an outer circular circumference of such size that it fits the inner circumference of bar 18 snugly. Adjustment screw 28 threads into sliding nut 24 and causes it to move longitudinally in either direction along the bar when properly rotated. Screw 28 is held in proper place by set screws 29 and 30 which operate in a recess in screw 28. A collar 31, also held in place by set-screws 29 and 30, is provided to keep screw 28 in correct axial alignment.

From the foregoing detailed description of parts and members it will be clear that the distance along the bar 18 between housings 11 and 11' can be varied by hand movement of the left housing until the approximate desired distance is obtained, and then a fine adjustment of this distance can be obtained by means of adjusting screw 28. The relative motion in this direction between dot 4 and dot 4' will be hereinafter referred to as the $b-x$ motion. Furthermore it will be clear that relative motion between dots 4 and 4' in a horizontal plane and at right angles to the axis of bar 18 can be effected by the use of adjusting screw 7. This relative movement will hereafter be referred to as the $b-y$ motion. Also, it will be clear that relative or concurrent vertical motion of or between dots 4 and 4' can be effected by means of adjusting screws 14 and 14'. This motion will be hereafter referred to as the $b-z$ motion. Relative motion between the two dots, and consequently between the two needle-points 2 and 2', in these three cardinal directions is the necessary fundamental consideration to cause the fused dot, as seen through the stereoscope, to rest exactly on a point at the desired elevation. It is, of course, apparent that the whole instrument can be first shifted by hand to an approximate operating position before fine adjustments are made with the screws.

In normal operation, after the two overlapping aerial photographs have been properly positioned and oriented under or in a conventional mirror-type stereoscope generally designated at 32, the $b-x$ distance between successive pairs of like points on the photographs will vary only by a small amount caused by differences in elevation. It is intended that the movement afforded by use of screw 28 will be sufficient to cover the range of travel caused by normal elevation differences so that after the first point has been marked or transferred the remainder of the points on those same two photographs can be marked without loosening clamp screw 19. This feature will permit rapid $b-x$ distance adjustment in most cases by use of screw 28 alone.

Furthermore, unless the aerial photographs are severely tilted with respect to each other, imaginary lines passing through successive pairs of like points on the photographs will be approximately parallel to each other. Accordingly, the line between dots 4 and 4' would, for settings on successive pairs of like points, assume approximately parallel positions. If the stereo-marker were rigidly fastened to any of the several types of drafting arms or parallel movement devices, it would, when moved about, automatically assume a position parallel to its initial position, and the necessary adjustment of the relative $b-y$ motion between the dots 4 and 4' could be accomplished through use of only the adjustment screw T. After an initial setting was made on the first point common on two photographs, subsequent b—y distance adjustments on successive pairs of points on the same two photographs could rapidly be made by means of screw T.

The stereo-marker can be operated with the bases of flanges 21 and 21' resting either on the surface of the photographs or on the surface which supports the photographs, since provision is made for a fine adjustment in a b—z direction of both needle-points 2 and 2' with respect to each other and with respect to the bases of the flanges 21 and 21'. The needles can thus be adjusted so that the points will not catch on, or scratch the surfaces of the photographs as the stereo-marker is shifted about. For this shifting, the needle-points are raised by screws 14 and 14' sufficiently to conveniently clear the surface of the photographs. When a point is being transferred the needle points 2 and 2' are lowered by means of the screws 14 and 14' to a level just above the surface of the photographs. This is most desirable for precise point transfer.

For a more detailed description of the modus operandi, see page 4, line 16, supra et seq. to page 7, line 3.

From the foregoing description it can be seen that this instrument is designed to accomplish the transfer and marking of points on aerial photographs with utmost precision limited only by the perceptive capabilities of the human eyes. Its operation can easily be learned by an inexperienced operator, and each point of transfer can be immediately checked, both while and after being done. It is also designed so that the operation can be accomplished with greater speed and facility than with other means employed in this highly technical art. It is further to be understood that its use is to be considered adaptable to any stereoscopic means of viewing aerial photographs either with or without optical magnification as a part of the stereoscope.

What is claimed:

1. A device for use in constructing maps from aerial photograps and employing the floating dot principle in operation, comprising a base, two adjustable arms associated with and extending from said base, and a transparent member on each of said arms carrying a small indicia dot and coincident point marking means.

2. A device for use in constructing maps from aerial photographs and employing the floating dot principle in operation, comprising a base consisting of a bar and two spaced surface-engaging members longitudinally slidable thereon, two adjustable arms associated with and extending from said surface-engaging members and a transparent member on each of said arms carrying a small indicia dot and coincident point marking means.

3. A device for use in constructing maps from aerial photographs and employing the floating dot principle in operation, comprising a base consisting of a bar and two surface-engaging members longitudinally slidable thereon, adjustable arms associated with and extending from each of said surface-engaging members, transparent members on said arms each carrying a small indicia dot and coincident point marking means and means for vertical adjustment of said arms.

4. A device for use in constructing maps from aerial photographs and employing the floating dot principle in operation, comprising a base consisting of a bar and two surface-engaging members longitudinally slidable thereon, adjustable arms associated with and extending at right angles to said bar from each of said surface-engaging members, transparent members at the outer end of each arm carrying a small indicia dot, and needle-point marking means coincident with and disposed immediately beneath said dots.

5. A device for use in constructing maps from aerial photographs and employing the floating dot principle in operation, comprising a base consisting of a bar and two surface-engaging members longitudinally slidable thereon, adjustable arms associated with and extending at right angles to said bar from each of said surface engaging members, transparent members at the outer end of each arm carrying a small indicia dot, needle-point marking means coincident with and disposed immediately beneath said dots, means for vertical adjustment of said arms and means for adjusting the distance between the arms.

6. A device for use in constructing maps from aerial photographs and employing the floating dot principle in operation, comprising a base consisting of a bar and two surface-engaging members longitudinally slidable thereon, adjustable resilient arms associated with and extending at right angles to said bar from each of said surface-engaging members, transparent members at the outer end of each arm carrying a small indicia dot, needle-point marking means coincident with and disposed immediately beneath said dots, means for vertical adjustment of said arms and means for adjusting the distance between the arms.

7. A device for use in constructing maps from aerial photographs and employing the floating dot principle in operation, comprising a base consisting of a bar and two surface-engaging members longitudinally slidable thereon, adjustable resilient arms associated with and extending at right angles to said bar from each of said surface-engaging members, transparent members at the outer end of each arm carrying a small indicia dot, needle-point marking means coincident with and disposed immediately beneath said data, means for vertical adjustment of said arms, means for adjusting the distance between the arms, and means on one of said arms for adjusting the distance between the dot and the bar.

EUGENE J. SCHLATTER.

REFERENCES CITED

The following references are of record in the file of this patent:

UNITED STATES PATENTS

| Number | Name | Date |
|---|---|---|
| 1,666,934 | Haywood | Apr. 24, 1928 |
| 1,999,236 | Hess | Apr. 30, 1935 |
| 2,208,435 | Simpson | July 16, 1940 |
| 2,369,634 | Abrams et al. | Feb. 20, 1945 |

FOREIGN PATENTS

| Number | Country | Date |
|---|---|---|
| 3,777 | Great Britain | Mar. 24, 1885 |
| 469,354 | Germany | Dec. 8, 1928 |